(12) United States Patent
Gupta et al.

(10) Patent No.: US 10,983,880 B2
(45) Date of Patent: Apr. 20, 2021

(54) ROLE DESIGNATION IN A HIGH AVAILABILITY NODE

(71) Applicant: HEWLETT PACKARD ENTERPRISE DEVELOPMENT LP, Houston, TX (US)

(72) Inventors: Manan Gupta, San Jose, CA (US); Sudhanshu Rajvaidya, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 112 days.

(21) Appl. No.: 16/051,149

(22) Filed: Jul. 31, 2018

(65) Prior Publication Data

US 2020/0042410 A1 Feb. 6, 2020

(51) Int. Cl.
| | |
|---|---|
| *G06F 11/00* | (2006.01) |
| *G06F 11/20* | (2006.01) |
| *H04L 29/08* | (2006.01) |
| *G06F 11/14* | (2006.01) |

(Continued)

(52) U.S. Cl.
CPC ...... *G06F 11/2023* (2013.01); *G06F 11/0709* (2013.01); *G06F 11/1425* (2013.01); *G06F 11/1441* (2013.01); *G06F 11/2046* (2013.01); *G06F 11/2094* (2013.01); *G06F 11/2097* (2013.01); *H04L 67/1097* (2013.01); *H04L 69/40* (2013.01)

(58) Field of Classification Search
CPC ............... G06F 11/142; G06F 11/1423; G06F 11/1425; G06F 11/16; G06F 11/20; G06F 11/2005; G06F 11/2007; G06F 11/202; G06F 11/2023; G06F 11/2092; G06F 11/0709; G06F 11/2098; G06F 11/2089; G06F 11/2071

USPC .......................................................... 714/4.11
See application file for complete search history.

(56) References Cited

U.S. PATENT DOCUMENTS

| | | | |
|---|---|---|---|
| 6,920,580 B1 | 7/2005 | Cramer et al. | |
| 7,818,515 B1 * | 10/2010 | Umbehocker | ........ G06F 3/0683 711/154 |
| 9,367,410 B2 | 6/2016 | Tang et al. | |

(Continued)

OTHER PUBLICATIONS

Chung, D., "Infrakit Under the Hood: High Availability," Jan. 12, 2017, https://blog.docker.com/2017/01/infrakit-hood-high-availability/.

(Continued)

*Primary Examiner* — Sarai E Butler
(74) *Attorney, Agent, or Firm* — Trop, Pruner & Hu, P.C.

(57) ABSTRACT

A high-availability network device cluster role synchronization technique for devices configured with multiple network controllers is disclosed. An HA node may contain information regarding a role within a cluster for that HA node. This information should properly be maintained or erased based on a type of failover for an HA device. For example, if there is a loss of the active controller that causes only a controller failover, changes to the role of the HA node may not be necessary. Thus, an election process within a cluster may be avoided. However, if a failover of an entire HA node occurs (or restart of an HA node), role information prior to the restart may not be applicable and an election process may need to be initiated such that the cluster may continue to function. Different types of roles may exist for nodes within a cluster.

18 Claims, 6 Drawing Sheets

(51) Int. Cl.
*G06F 11/07* (2006.01)
*H04L 29/14* (2006.01)

(56) References Cited

U.S. PATENT DOCUMENTS

| | | | |
|---|---|---|---|
| 9,678,667 B2 | 6/2017 | Panasko et al. | |
| 2002/0161970 A1* | 10/2002 | Busser | G06F 11/1076 |
| | | | 711/114 |
| 2008/0130219 A1* | 6/2008 | Rabinovitz | G11B 33/1426 |
| | | | 361/679.31 |
| 2011/0173490 A1* | 7/2011 | Narayanaswamy | |
| | | | H04L 63/1408 |
| | | | 714/4.11 |
| 2012/0117241 A1* | 5/2012 | Witt | H04L 67/00 |
| | | | 709/226 |
| 2012/0294352 A1* | 11/2012 | Koum | H04N 21/234309 |
| | | | 375/240.01 |
| 2014/0317437 A1* | 10/2014 | LeFevre | G06F 11/2033 |
| | | | 714/4.11 |
| 2016/0050123 A1* | 2/2016 | Nishanov | H04L 41/5003 |
| | | | 709/223 |
| 2017/0006105 A1* | 1/2017 | Shraer | H04L 67/1025 |
| 2017/0116095 A1 | 4/2017 | Schatz et al. | |
| 2017/0154093 A1* | 6/2017 | Shetty | G06F 16/214 |
| 2017/0220431 A1* | 8/2017 | Joshi | G06F 11/2033 |
| 2019/0294569 A1* | 9/2019 | Moolanmoozha | G06F 13/24 |

OTHER PUBLICATIONS

NetApp, Inc., "Clustered Data Ontap® 8.3: MetroCluster Management and Disaster Recovery Guide," Jan. 2015, <https://library.netapp.com/ecm/ecm_download_file/ECMP1636018>.

* cited by examiner

ROLE DESIGNATION IN A HIGH AVAILABILITY NODE

BACKGROUND

In the field of computing, failures of components may not be acceptable for certain applications or devices. These types of applications and devices are commonly referred to as high-availability (HA) devices or applications. To create a high-availability attribute for a device or application, redundancy for physical or functional components may be provided. Redundancy may be implemented such that a first instance of either an application or component represents a primary and a secondary instance of that same application or component represents a backup. The backup may then be poised to take over in case of issues with the primary. An instance representing a backup does not necessarily have to be identical to the primary instance but may be a logical or functional equivalent to the primary. In some cases, particularly with hardware redundancy, a system administrator will select and configure identical redundant components.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

This disclosure is directed to software and hardware of an HA node (e.g., a computer system, host, cluster processor, compute resource, or the like). The HA node of this disclosure has redundant components that exist in either the primary role or a backup role and may be implemented such that a failover from primary to backup may be performed without loss of functionality of the node. Also, two HA nodes may be configured as a primary and backup to each other such that a first HA node may assume a primary role with respect to applications being supported by the two nodes. That is, the two nodes may themselves have an internal HA architecture and further support an HA application (or applications) across them. In this manner, critical applications may be configured such that they are available with nearly 100 percent uptime. In a simple implementation, a cluster of two nodes may provide the required redundancy. However, for some critical applications any number of nodes at any number of locations may provide redundancy to each other.

Computer clusters may be configured for different purposes ranging from general purpose business needs such as web-service support, to computation-intensive scientific calculations. In either case, the cluster may use a high-availability approach. Note that the attributes described herein are not exclusive of other techniques and a "computer cluster" may also be used with other high-availability approaches, etc.

"Load-balancing" clusters represent a subset of cluster configurations in which cluster-nodes may share computational workload to provide better overall performance. For example, a web server cluster may assign different queries to different nodes, so the overall response time may be optimized. However, approaches to load-balancing may significantly differ among applications, e.g., a high-performance cluster used for scientific computations may balance load with different algorithms than a web-server cluster which may just use a simple round-robin method by assigning each new request to a different node.

In some clusters, tasks may be assigned to nodes associated with a specific role where a set of different roles may be shared across the nodes of the cluster. For example, the role of primary/active and backup/standby is a common role. There exist other roles, for example in a distributed storage solution, different nodes may be considered "upstream nodes" and other nodes may be considered "downstream nodes." In this example, an upstream node would be a node higher in the hierarchy of nodes such that subsequent nodes downstream from a specific node may provide redundancy for that node. In this model, there may be many different levels in the hierarchy such that nodes may be assigned based on a priority that may be based on their position within the hierarchy.

In yet another example, a node may be designated as a "leader" for a group of nodes with any number of other nodes in that group of nodes (e.g., a cluster) designated as "followers" or the like. In this model, there may be only a single leader and many followers. If a leader is lost (e.g., becomes unavailable or fails) then remaining follower nodes (and possibly a witness node) may have an election to determine a new leader. The witness node may represent a node of a quorum whereby the witness node represents a tie-breaker vote in the election process when needed. The witness node may be an active participant of the group (e.g., quorum, cluster) or may be an additional non-active member of the group configured to only break ties.

Some computer clusters are used for computation-intensive purposes, rather than handling IO-oriented operations such as web service or databases. For instance, a computer cluster might support computational simulations of vehicle crashes or weather. Very tightly coupled computer clusters may also be designed for work that may approach "supercomputing".

As briefly mentioned above, "High-availability clusters" (also referred to as failover clusters, or HA clusters) may improve the availability of the overall cluster approach. In general, an HA cluster operates by having redundant nodes, which are then used to provide service when system components fail. HA cluster implementations attempt to use redundancy of cluster components to eliminate single points of failure. There are commercial implementations of High-Availability clusters for many operating systems. High-availability clusters may be set up as groups of computers to support server applications (or distributed applications) that can be reliably utilized with a minimum amount of downtime. HA clusters may operate by using high availability software to harness redundant computers in groups or clusters that provide continued service when system components fail. Without clustering, if a server running a particular application crashes, the application will be unavailable until the crashed server is fixed. HA clustering attempts to address this situation by detecting hardware/software faults, and immediately restarting the application on another system without requiring administrative intervention, a process known as failover. As part of this process, clustering software may configure the node taking over for another (e.g., failover) before starting the application on it. For example, appropriate file systems may need to be imported and mounted, network hardware may have to be configured, and some supporting applications may need to be running as well. HA clusters are often used for critical databases, file sharing on a network, business applications, and customer services such as electronic commerce websites.

Some HA cluster implementations may attempt to build even further redundancy into a cluster to eliminate single points of failure, including multiple network connections and data storage which is redundantly connected via storage area networks. HA clusters sometimes use a heartbeat network connection to monitor the health and status of each node in the cluster and to exchange the above-mentioned role information. One subtle but serious condition clustering software should be able to handle is "split-brain." Split-brain may occur when all of the heartbeat message links go down simultaneously (or communication to a significant portion of the nodes of a cluster is split), but the cluster nodes are still running. If that happens, each node in the cluster (or a node in each split portion) may mistakenly decide that every other node has gone down and attempt to start services that other nodes are still running. For example, a node may attempt to assume a role that is concurrently being provided by another node where only one node in the cluster should have that particular role (e.g., the role of "LEADER"). Having duplicate instances of services (or certain roles) may cause data corruption on the shared storage or improper functioning of the distributed server application. To avoid this scenario, HA clusters may use a quorum witness device or quorum witness storage (local or cloud). By design, a witness device cannot be shared between two halves of a split cluster, so in the event that all cluster members cannot communicate with each other (e.g., failed heartbeat), if a member cannot access the witness, that member cannot transition from a standby role to an active role (or assume certain roles such as the leader role that is based on an election).

To expand upon the concept of roles, in a group of nodes each node may have a role with respect to other nodes. For example, a node may have won an election process to establish that node as having a "leader role." Some roles, such as this leader role, must be singular with in cluster (or a split-brain may exist). In a case where a node having a leader role includes a high-availability controller pair, failure of a single controller may not necessarily cause that node to lose its leadership role (and thus may prevent an unnecessary election process). Alternatively, a leadership role should be lost upon restart of that node and force a new election process possibly without requiring other nodes to detect loss of the leader. For example, an election may be initiated rather than waiting for heartbeat detection to initiate the election. That is, there are circumstances where a role (e.g., "leader role") may wish to be maintained through a component failure (e.g., node still available) and other case where a role should be lost such that another node may assume that role for the cluster. A simple case of the situation where a leadership role should be lost is a forced full restart of the server currently acting as the leader of a cluster.

To accomplish proper and efficient maintenance of a leadership role, one controller in such a node may replicate the leader election information for the group to non-persistent memory of the other controller of the node, such that the leader election information may be used after a failover between controllers of that node (e.g., so leader election process is not triggered by failover). By using non-persistent memory (or non-persistent role information), the leader election information may be lost (or erased) when there is a node restart, such that failure of the node currently acting as a leader will trigger a new leader election process (e.g., after restart of node rather than just a controller failover, or after other nodes detect failure of the leader).

Figure 1:
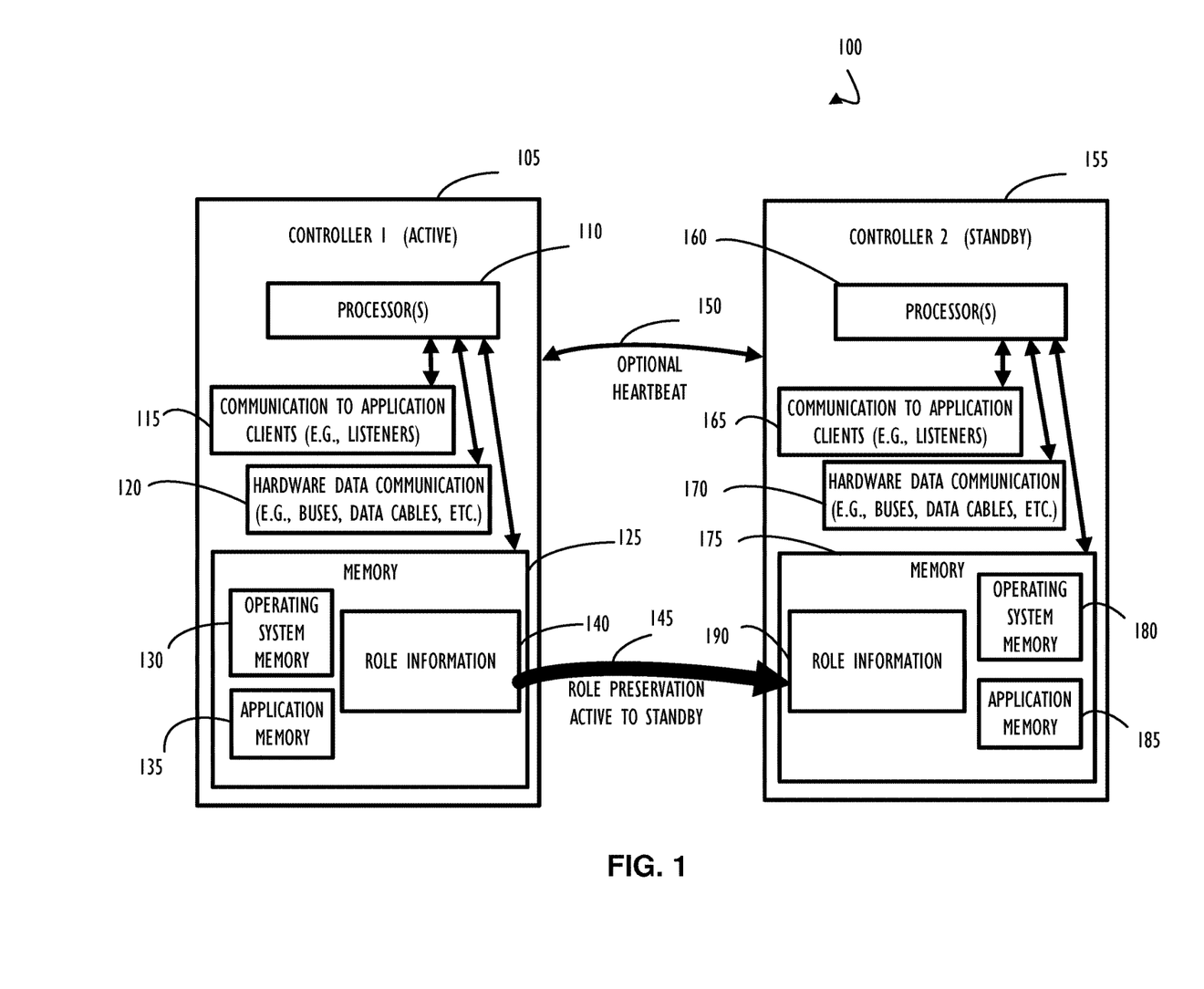
FIG. 1 is a functional block diagram representation of two controllers (e.g., a redundant hardware component) of a single node from a cluster of nodes with one controller being a primary "active" controller and the second controller being a backup "standby" controller for the same node, according to one or more disclosed implementations.

Referring now to FIG. 1, an example of two internal controllers for a high-availability node is illustrated in block diagram 100. In this example, controller 1 110 is identified as the "active" controller and Controller 2 215 is identified as the "standby" controller. As explained in more detail below, a high-availability node, may have any number of controllers and typically has at least two. In some configurations, the controllers work as a primary/backup pair with a dedicated active controller and a dedicated standby controller. In a primary/backup configuration, the primary performs all functions and the standby, as its name suggests, waits to become the active if a failover condition is reached. Failover may be automatic or manual. In general, failover at a high level refers to the active and standby switching roles so that the standby becomes the active and the active (typically after restarting of the controller) becomes the standby. Note that failover of a controller within an HA node does not imply that the HA node itself performs a restart. However, it is possible that the failover from a primary controller to a backup controller may occur as part of a restart of the HA node. For example, if the primary controller failure causes a crash of the HA node such that the HA node must restart.

Continuing with FIG. 1, block diagram 100 illustrates further details for an active and a standby controller that may be implemented to support a role synchronization and failover capability, according to one or more disclosed implementations. As mentioned throughout this disclosure, the designation of active or standby for a component may change over time due to a failover action for that component of an HA node. Further the HA node may have a role (different from the role of the controller) relative to how that node interacts with other nodes of a cluster (e.g., an HA cluster and the above-mentioned leadership role). Failover actions for nodes (or controllers of a node) may be manually initiated (e.g., to perform system maintenance or alter network configuration) or may be automatically initiated (e.g., as a response to hardware or software failure). One example automatic failover initiation cause might be a loss of communication (e.g., optional heartbeat 150) between the active and the standby controller. For example, if the standby controller 155 does not receive a heartbeat message within a pre-determined amount of time, the standby controller 155 may consider the active controller 105 non-functional and attempt to assume the active role by initiating a failover of the controllers within the HA node (e.g., without a restart of that node). Another example of an automatically initiated failover of the HA node may be based on a condition of loss of communication to the HA node from one or more clients of the cluster or other nodes of the cluster. In either case, the failover action may be initiated as a "recovery" action to prevent an extended outage of the application(s) executing within the HA cluster.

As illustrated in the example of FIG. 1, each of controller 1 105 and controller 2 155 includes one or more processors 110 and 160, respectively. Processors within a controller may execute an operating system (not shown) to execute functions necessary to support operation of an associated controller. Note that multiple controllers typically have individual instances of their supporting operating system. That is, the operating system for a controller executes locally on the controller. Each of controller 1 105 and controller 2 155 are also illustrated to include functional blocks 115 and 165, respectively. Functional blocks 115 and 165 represent that each controller may have an association to multiple client applications.

Continuing with FIG. 1, each of controller 1 105 and controller 2 155 are further illustrated to include functional blocks 120 and 170, respectively. Functional blocks 120 and 170 represent that each controller may have one or more types of hardware data communication available internally. For example, a controller may have one or more data busses or be connected to one or more data communication cables. Each of controllers 1 105 and 2 155 are illustrated to include a memory 125 and 175, respectively. Memory local to a controller may be used to support functionality of the controller. For example, memory 125 on controller 1 105 includes an operating system memory 130, an application memory 135, and "role information" memory 140. Similarly, memory 175 on controller 2155 includes an operating system memory 180, application memory 185, and role information memory 190. Each of these memories may be persistent memory (e.g., maintained through a restart) or non-persistent memory (cleared automatically as part of a restart). Each area shown in FIG. 1 may represent logical portions of a single memory or may be independent physical memories depending on implementation requirements. Further, these different memory areas may be combined or segregated depending on design, security, reliability, cost, or other factors.

As illustrated in FIG. 1, Uni-directional arrow 145 indicates that role information for the HA node (not controller role) may be transferred from the active controller 1 104 to standby controller 2 155 and result in an update to memory area 190 on controller 2 155. To be explicitly clear, this role information represents the role of the HA node (e.g., leadership information) with respect to other nodes of an HA cluster as opposed to the role of the controller. Storing role information associated with an active and standby controller facilitates maintenance of role information appropriately through controller failovers, HA node restarts, and application failovers according to the techniques of this disclosure (see FIG. 3). Note that if a controller failover condition is responded to, the active and standby roles of each controller would be reversed and the direction of arrow 145 would be changed to point from the new active to the new standby.

Figure 2:
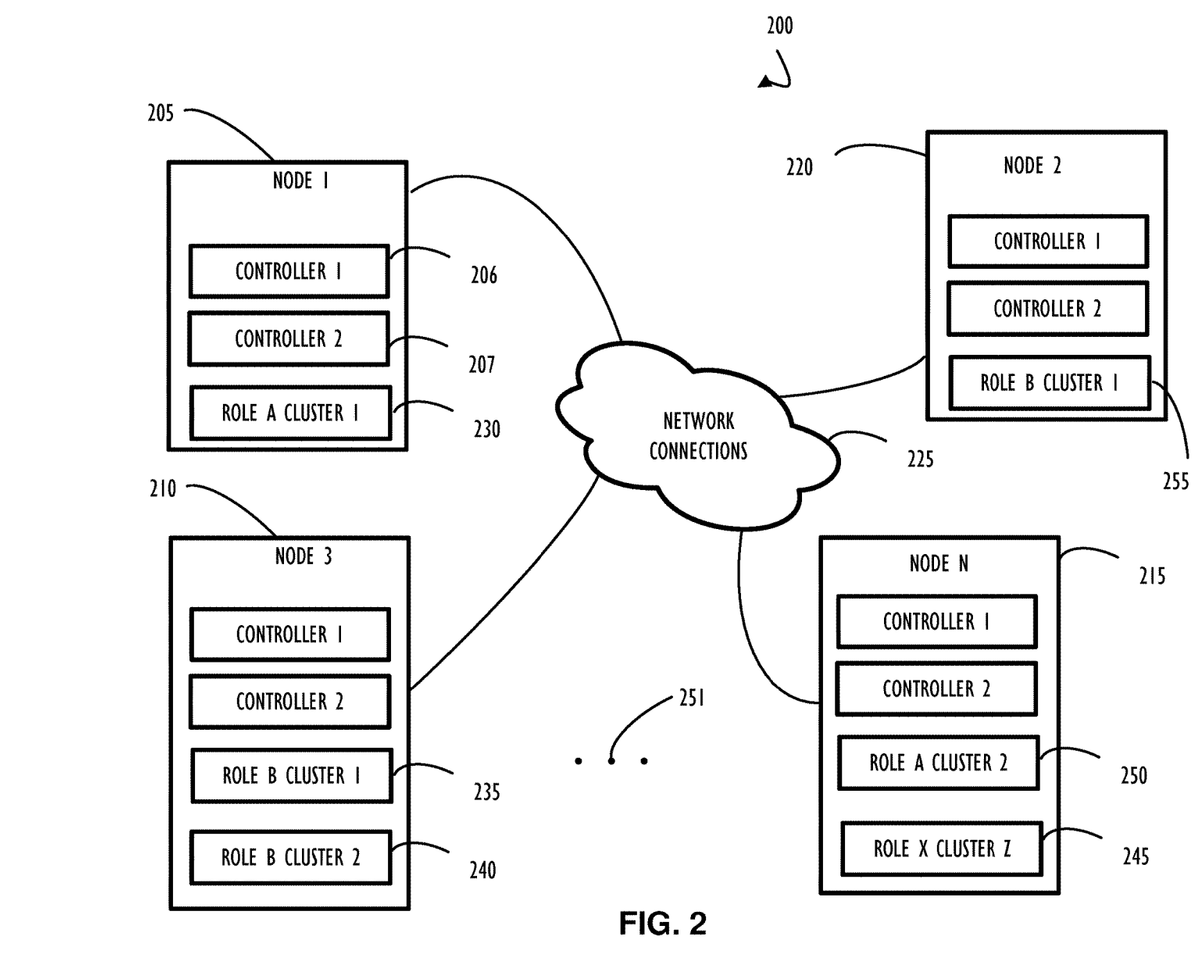
FIG. 2 is a block diagram representing multiple nodes, clusters, and roles, with each node having redundant controllers, according to one or more disclosed implementations.

Referring now to FIG. 2, block diagram 200 illustrates multiple nodes (e.g., HA nodes with multiple controllers) connected via a network as illustrated by network connection cloud 225, according to one or more disclosed implementations. Each node of FIG. 2 may belong to a cluster or quorum data store. For example, each node may host applications and/or data in support of a cluster or quorum with each node having a role designation as to their current functional role within the cluster or quorum. In this example, roles are reference generically as roles A, B, and X because, as explained above, many roles are possible. Also, as explained above, some roles may be duplicated within a cluster and other roles may be singular within a cluster (e.g., leader role is singular because a cluster only has one leader at any given time).

Node 1 205 is illustrated in this example to have controller 1 206, controller 2 207 and is currently designated with role "A" for cluster 1 230. Node 2 220 also has two controllers and is currently designated with role "B" for cluster 1. Node 3 210 is a member of two different clusters concurrently. Node 3 210 is currently designated with role "B" for cluster 1 and role "B'" for cluster 2. Ellipses 251 indicates that any number of nodes are possible. Node N 215 is also a member of multiple clusters concurrently and has different roles for each of the multiple clusters. In this example, Node N 215 is currently designated with role "A" for cluster 2 and role "X" for cluster Z. Accordingly, FIG. 2 illustrates that a cluster may include different numbers of nodes (cluster 1 includes three nodes, namely Node 1 205, Node 2 220, and Node 3 210; cluster 2 includes two nodes, namely Node 3 210 and Node N 215) and that any given node may be a member of different clusters concurrently with a different role designation for each of the different clusters. Within each of the nodes of block diagram 200, the two controllers of that node may share role information in accordance with disclosed techniques such that roles may be preserved or erased as necessary based on restart of controllers within a node or nodes within a cluster as appropriate. That is, a role election may be suppressed in certain situations and forced in others based on the disclosed maintenance technique for sharing role information between controllers.

Figure 3:
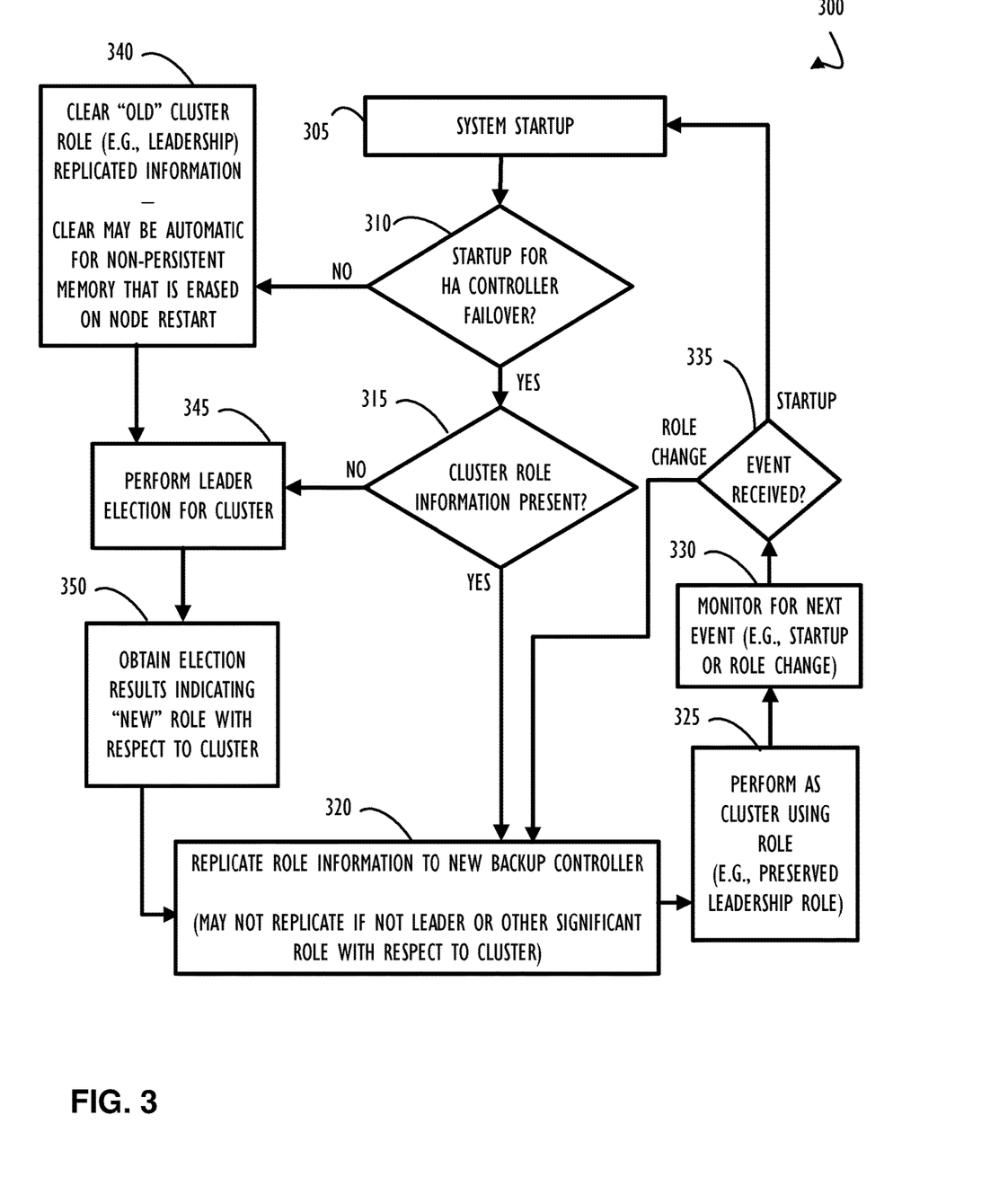
FIG. 3 is a flow chart representing an example method of a high-availability role maintenance procedure for a node within a cluster of nodes, according to one or more disclosed implementations.

FIG. 3 is a flow chart representing a possible method 300 to property support role information exchange between controllers of a high-availability node with respect to the current role assignment of that node within an HA cluster, according to one or more disclosed implementations. Method 300 may be performed by a processor of an HA node that has access to appropriate areas of memory also accessible to each of the controllers participating in the disclosed role maintenance technique. Alternatively, each of the controllers of an HA node may communicate directly with each other to accomplish the technique without assistance of another processor. As a third, alternative, a combination of processor (e.g., HA node processors and controller processors) may work together to perform the method with some portions being performed by different processors, for example, that are local to the HA node. Method 300 begins at block 305 with a system startup. For example, startup of an HA node as a member of a cluster where roles for different members are maintained. Decision 310 indicates that the HA node may determine if this is a controller failover startup or a complete node restart. If it is only a controller failover (which is not an actual restart of the HA node), the YES prong of decision 310, flow continues to decision 315 where a determination may be made as to if cluster role information is present. That is, it may be determined if the node for which the controller is being failed over has role information with respect to the role that this HA node is currently performing with respect to the cluster(s) for which it is a member. If so, the YES prong of decision 315, flow continues to block 320 where, on the up side of the failover, role information may be replicated from the now active (previously backup but synchronized see arrow 145 of FIG. 1) controller to the new backup controller. That is, the function of arrow 145 of FIG. 1 may be performed (in the opposite direction from prior to the failover) to transfer role information to a newly initialized backup controller. Also, as indicated at block 320, if the role information is not significant (e.g., not a role worth synchronizing) the data may not be replicated across controllers. Significance of roles is a design decision and may vary from one implementation to another.

Flow then continues to block 325 where the HA node may perform as a cluster using the role information preserved from prior to the controller failover. That is, if the HA node had a leader role prior to the controller failover, that HA node may maintain that leader role. Flow then continues to block 330 where processing may continue until a next event happens for the HA node with respect to the cluster. Decision 335 indicates that an event has been received. Decision 335 makes a determination if the role of the HA node has been changed or if a startup event has been received. If an update to role information is available, the ROLE CHANGE prong of decision 335, flow returns to block 320 where the newly updated role may be replicated (e.g., synchronized) with the backup controller. A role change may be caused, for example, by an election process across the nodes of the cluster or for some other reason like manual intervention. Alternatively, if a startup event is received, the STARTUP prong of decision 325, flow returns to block 305.

Decision 310 may also indicate that the startup is not related to an HA controller failover as indicated by the NO prong of decision 310. In this situation flow continues to block 340 where "old" cluster role information may be cleared so that it is not maintained over a restart (or failover) of the HA node. In some implementations, role information for a controller may be stored in non-persistent (e.g., volatile) memory such that it is automatically cleared as part of the restart operation or a loss of power to the HA node. Typically, when a computer system restarts, all volatile non-persistent memory may be re-initialized (or unallocated) for all computer processes such that they start with unpopulated memory. Also, if the non-persistent memory storing the role is cache memory, that cache may be cleared as part of the restart/re-initialization process for the HA node. Flow then continues to block 345 where a cluster role election (e.g., an election for a cluster leader) may be initiated. Thus, by storing synchronized role information in non-persistent (volatile) memory storage, a restart may automatically cause initiation of a cluster role election process on the upside of the failover (or restart). Note, block 345 may also be reached via the NO prong of decision 315 when no cluster role information is known at the HA node following a controller failover. In some cases, the perform cluster role election of block 345 may simply be obtaining information from other nodes within the cluster as to which roles are currently allocated and if there is already a leadership role assigned, identification of the HA node currently assigned that leadership role. Block 350 indicates that the information from the cluster nodes or information from the election results may be obtained with respect to this HA node and its function with respect to other nodes of the cluster (e.g., its current cluster role). Flow may again continue to block 320 where the backup controller may receive replicated role information that is now current.

Figure 4:
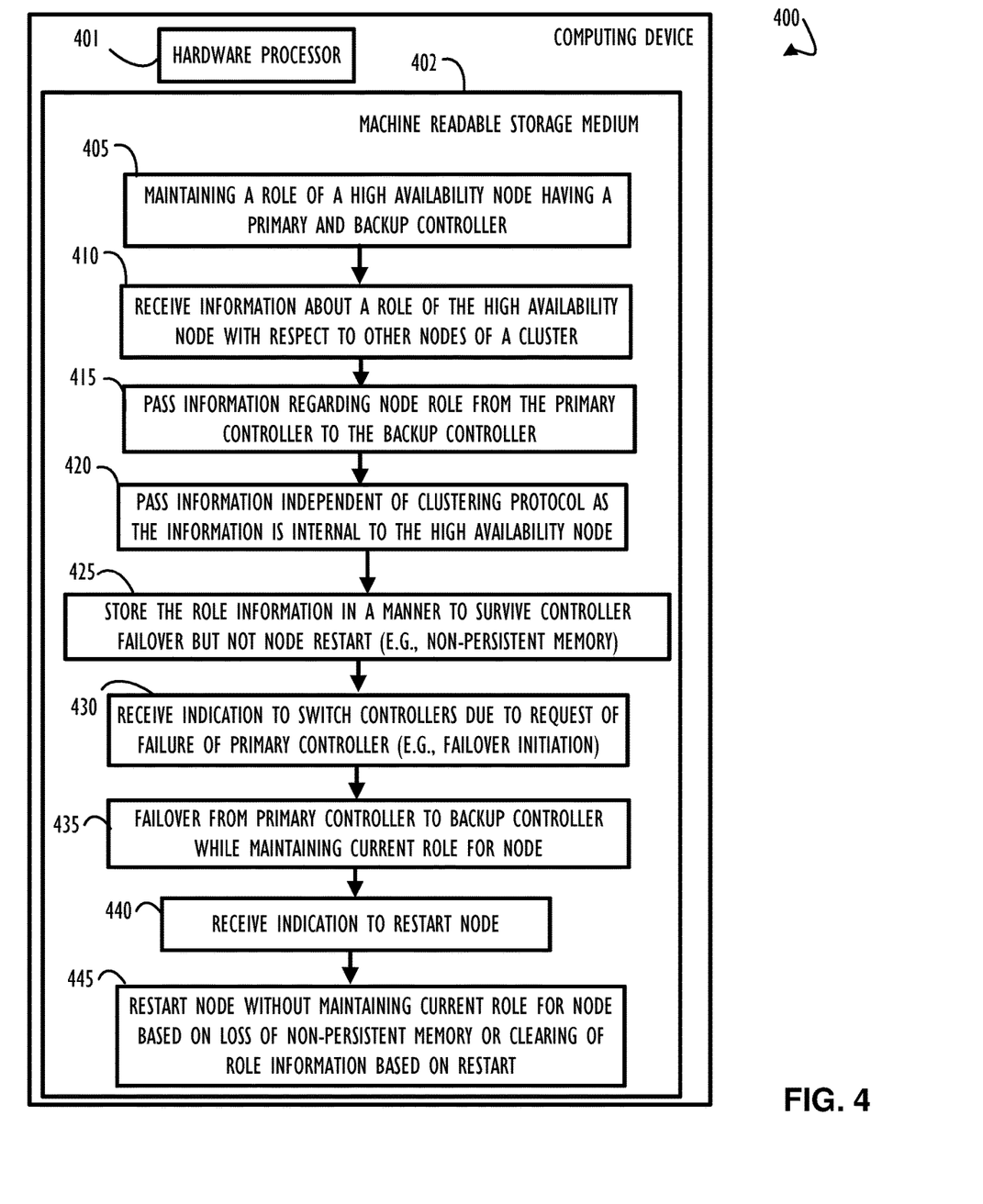
FIG. 4 illustrates a computing device including a processor and computer readable medium that may store instructions that when executed by the processor cause the processor to perform a method of maintaining/determining a role for a node within a cluster of nodes, according to one or more disclosed implementations.

FIG. 4 is a block diagram representing a computing device 400 implementing a method to support maintaining role of an HA node having a primary and backup controller, according to one or more disclosed implementations. Computing device 400 includes a hardware processor 401 and a machine readable storage medium 402. As illustrated, machine readable medium 402 may store instructions, that when executed by hardware processor 401 (either directly or via emulation/virtualization), cause hardware processor 401 to perform one or more disclosed methods to properly maintain or re-initialize (e.g., via election process initiation) role information for an HA node as a member of a cluster (e.g., a disk storage quorum or other distributed HA application). In this example, the instructions stored reflect a method similar to method 300 discussed above.

Beginning at block 405, the stored instruction may be directed toward processing role information for an HA node through either a controller failover or a restart of the HA node. Block 410 indicates that information with respect to a role assignment for an HA node with respect to other nodes within a cluster may be obtained. Block 415 indicates that information regarding the role of the HA node may be passed (e.g., synchronized) from the primary (active) controller to the secondary (backup) controller. Block 420 indicates that the information may be passed independently of a clustering protocol, in part, because the information may be passed internally to the HA node. Further, there may be no need to involve other nodes of the cluster in the synchronization of information because the HA node is not changing its current role as part of this synchronization. Note that the stored instructions in this example may be executed by an HA node such that the role of the HA node may be either maintained through a controller only failover or erased (e.g., not sustained) through a restart of the HA node. In some implementations, the role synchronization may be stored to a non-persistent memory area (e.g., cache or volatile memory area) such that it is automatically erased as a result of a node restart as indicated at block 425. Block 430 indicates that an indication to switch internal controllers of an HA node may be received (e.g., either as a result of failure or manual request). Block 435 indicates that a failover of the primary (active) controller of an HA node to the backup (standby) controller of that same HA node may take place and maintain a current role for the HA node.

Block 440 indicates that the HA node may receive an indication to restart. Block 445 indicates that, as a result of the restart, the current role for the HA node may be "lost" such that a new election process may be initiated as a result of the restart.

Figure 5:
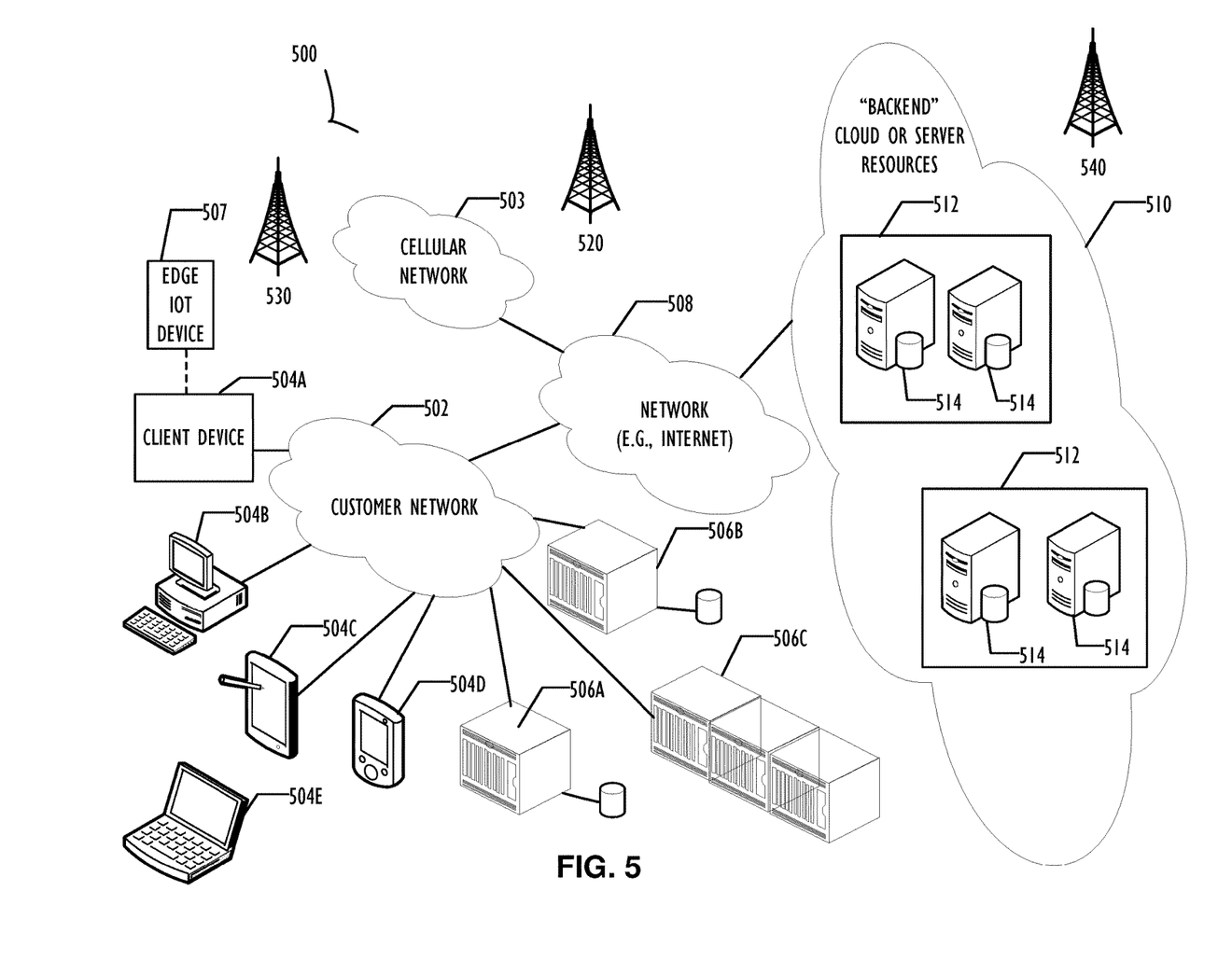
FIG. 5 represents a computer network infrastructure that may be used to implement and benefit from all or part of the disclosed role maintenance and determination a high-availability computing device (e.g., HA node), according to one or more disclosed embodiments.

FIG. 5 represents a computer network infrastructure 500 that may be used to implement all or part of the disclosed high-availability role maintenance technique for a high-availability node of a cluster or other network device, according to one or more disclosed embodiments. Network infrastructure 500 includes a set of networks where embodiments of the present disclosure may operate. Network infrastructure 500 comprises a customer network 502, network 508, cellular network 503, and a cloud service provider network 510. In one embodiment, the customer network 502 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 502 represents an enterprise network that could include or be communicatively coupled to one or more local area networks (LANs), virtual networks, data centers and/or other remote networks (e.g., 508, 510). In the context of the present disclosure, customer network 502 may include one or more high-availability nodes, clusters, or network devices using methods and techniques such as those described above. Also, nodes of a high-availability cluster may be present at different geographic locations (e.g., separate data centers) to further increase likelihood of availability to client devices.

As shown in FIG. 5, customer network 502 may be connected to one or more client devices 504A-E and allow the client devices 504A-E to communicate with each other and/or with cloud service provider network 510, via network 508 (e.g., Internet). Client devices 504A-E may be computing systems such as desktop computer 504B, tablet computer 504C, mobile phone 504D, laptop computer (shown as wireless) 504E, and/or other types of computing systems generically shown as client device 504A.

Network infrastructure 500 may also include other types of devices generally referred to as Internet of Things (IoT) (e.g., edge IOT device 507) that may be configured to send and receive information via a network to access cloud computing services or interact with a remote web browser application (e.g., to receive user input).

FIG. 5 also illustrates that customer network 502 includes local compute resources 506A-C that may include a server, access point, router, or other device configured to provide for local computational resources and/or facilitate communication amongst networks and devices. For example, local compute resources 506A-C may be one or more physical local hardware devices, such as the frames outlined above. Local compute resources 506A-C may also facilitate communication between other external applications, data sources, and services, and customer network 502.

Network infrastructure 500 also includes cellular network 503 for use with mobile communication devices. Mobile cellular networks support mobile phones and many other types of mobile devices such as laptops etc. Mobile devices in network infrastructure 500 are illustrated as mobile phone 504D, laptop computer 504E, and tablet computer 504C. A mobile device such as mobile phone 504D may interact with one or more mobile provider networks as the mobile device moves, typically interacting with a plurality of mobile network towers 520, 530, and 540 for connecting to the cellular network 503.

FIG. 5 illustrates that customer network 502 is coupled to a network 508. Network 508 may include one or more computing networks available today, such as other LANs, wide area networks (WAN), the Internet, and/or other remote networks, in order to transfer data between client devices 504A-D and cloud service provider network 510. Each of the computing networks within network 508 may contain wired and/or wireless programmable devices that operate in the electrical and/or optical domain.

In FIG. 5, cloud service provider network 510 is illustrated as a remote network (e.g., a cloud network) that is able to communicate with client devices 504A-E via customer network 502 and network 508. The cloud service provider network 510 acts as a platform that provides additional computing resources to the client devices 504A-E and/or customer network 502. In one embodiment, cloud service provider network 510 includes one or more data centers 512 with one or more server instances 514 that may be configured in a cluster configuration to provide redundancy to each other. Cloud service provider network 510 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 6:
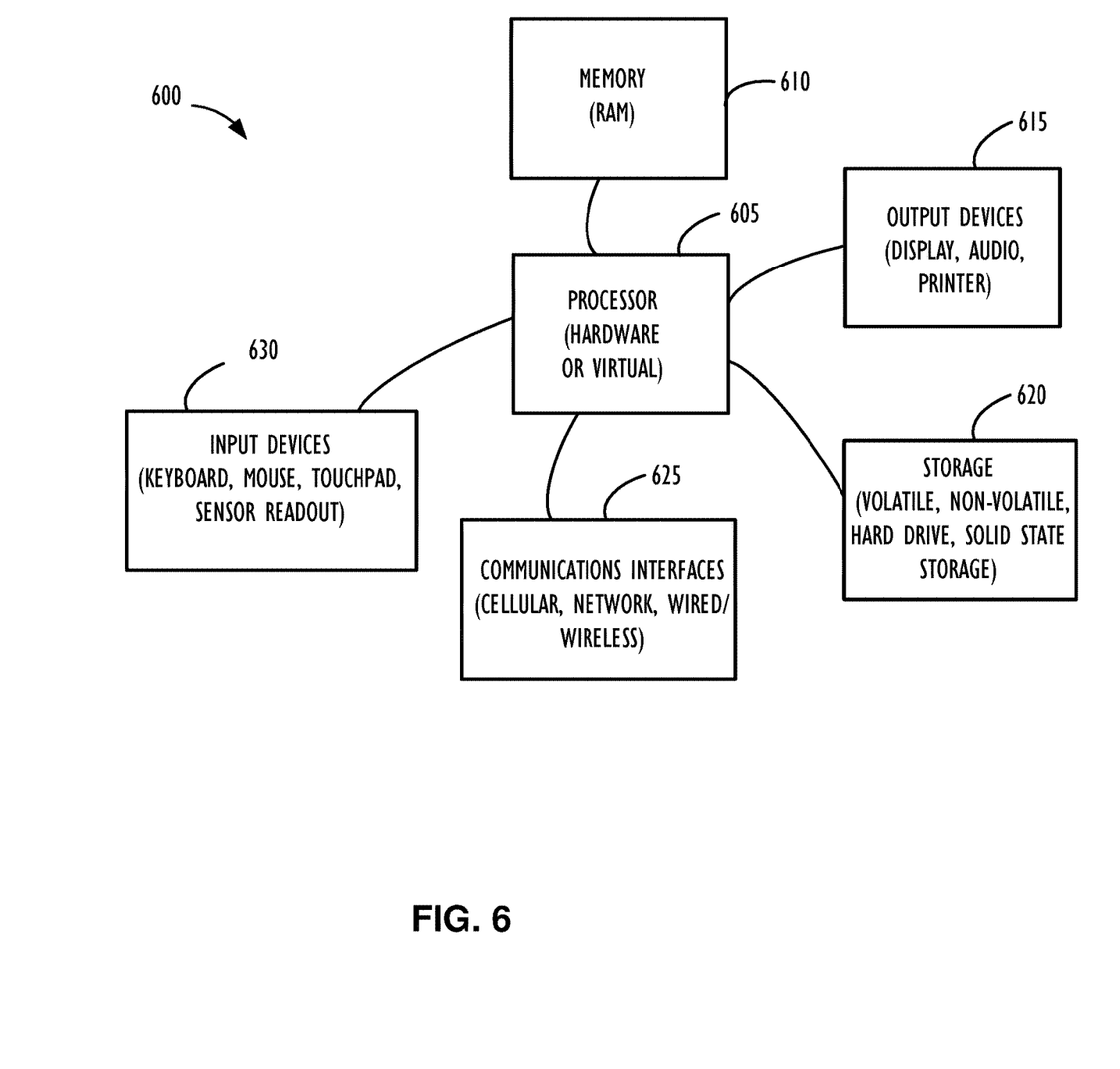
FIG. 6 illustrates a computer processing device that may be used to implement the functions, modules, processing platforms, execution platforms, communication devices, and other methods and processes of this disclosure.

FIG. 6 illustrates a computing device 600 that may be used to implement or be used with the functions, modules, processing platforms, execution platforms, communication devices, and other methods and processes of this disclosure. Specifically, an instance of computing device 600 may be used to implement a method for maintaining a role designation on multiple controllers of an HA node. Also, an instance of computing device 600 may be used to implement any of the nodes referenced in FIGS. 1-5 of this disclosure. Specifically, an instance of computing device 600 may be used to implement an HA node or another node of a cluster that may participate in a role election process. Also, computing device 600 illustrated in FIG. 6 could represent a client device or a physical server device (e.g., an HA node) and include either hardware or virtual processor(s) depending on the level of abstraction of the computing device. In some instances (without abstraction), computing device 600 and its elements, as shown in FIG. 6, each relate to physical hardware. Alternatively, in some instances one, more, or all of the elements could be implemented using emulators or virtual machines as levels of abstraction. In any case, no matter how many levels of abstraction away from the physical hardware, computing device 600 at its lowest level may be implemented on physical hardware.

As also shown in FIG. 6, computing device 600 may include one or more input devices 630, such as a keyboard, mouse, touchpad, or sensor readout (e.g., biometric scanner) and one or more output devices 615, such as displays, speakers for audio, or printers. Some devices may be configured as input/output devices also (e.g., a network interface or touchscreen display).

Computing device 600 may also include communications interfaces 625, such as a network communication unit that could include a wired communication component and/or a wireless communications component, which may be communicatively coupled to processor 605. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 6, computing device 600 includes one or more processing units such as processor 605 that contains one or more hardware processors, where each hardware processor may have a single or multiple processor cores. In one embodiment, the processor 605 may include at least one shared cache that stores data (e.g., computing instructions) that are utilized by one or more other components of processor 605. For example, the shared cache may be a locally cached data stored in a memory for faster access by components of the processing elements that make up processor 605. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 6, the processing elements that make up processor 605 may also include one or more of other types of hardware processing components, such as graphics processing units (GPU), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory medium configured to store various types of data. For example, memory 610 may include one or more storage devices 620 that comprise a non-volatile storage device and/or volatile memory. Volatile memory, such as random-access memory (RAM), can be any suitable non-permanent storage device. The non-volatile storage devices 620 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 620 may be used to store overflow data if allocated RAM is not large enough to hold all working data. The non-volatile storage devices 620 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage device 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600.

A user interface (e.g., output devices 615 and input devices 630) can include a display, positional input device (such as a mouse, touchpad, touchscreen, or the like), keyboard, or other forms of user input and output devices. The user interface components may be communicatively coupled to processor 605. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 600 may comprise other components well known in the art, such as sensors, powers sources, and/or analog-to-digital converters, not explicitly shown in FIG. 6.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of a high availability (HA) node having a first controller and a second controller, the method comprising:

receiving, at the first controller when the first controller is active, an indication of a cluster role of the HA node within a cluster of HA nodes, the second controller acting as a backup for the first controller when the first controller is active;

providing information regarding the cluster role from the first controller to the second controller that is acting as the backup for the first controller, via a mechanism used for exchanging HA state information independent of a clustering protocol, the information including an indication of which of the first controller and the second controller is active;

responsive to receiving the information at the second controller, storing the information in a non-persistent memory of the HA node;

in response to loss of the information in the non-persistent memory due to a power loss at the HA node, initiating, from the HA node, a new leader election process to determine the cluster role of the HA node among the cluster of HA nodes; and in response to a controller failover event within the HA node, perform a failover from the first controller to the second controller while preserving the cluster role of the HA node, the cluster role that is preserved being the cluster role of the HA node prior to the failover from the first controller to the second controller.

2. The computer-implemented method of claim 1, wherein the cluster role is a singular role assigned to one HA node of the cluster of HA nodes at a given time.

3. The computer-implemented method of claim 1, wherein the cluster role is a leadership role in the cluster of HA nodes prior to the failover, and wherein the HA node maintains the leadership role in the cluster of HA nodes after the failover from the first controller to the second controller.

4. The computer-implemented method of claim 1, wherein the failover causes the second controller to become active.

5. The computer-implemented method of claim 1, further comprising:
   after the failover, receiving an indication at the HA node to change to a second cluster role different from the cluster role; and
   providing information regarding the second cluster role from the second controller to the first controller via the mechanism used for exchanging HA state information independent of the clustering protocol.

6. The computer-implemented method of claim 1, further comprising:
   prior to the failover, receiving an indication at the HA node to change to a second cluster role different from the cluster role; and
   providing information regarding the second cluster role from the first controller to the second controller via the mechanism used for exchanging HA state information independent of the clustering protocol.

7. The computer-implemented method of claim 1, wherein the cluster of HA nodes is a first cluster of HA nodes, and wherein the HA node is a member of a second cluster of HA nodes, and the HA node has a cluster role in the second cluster of HA nodes that is different from the cluster role of the HA node in the first cluster of HA nodes.

8. A high availability (HA) node comprising:
   a first controller and a second controller, wherein the second controller is a backup for the first controller when the first controller is active; and
   a non-persistent memory,
   wherein the first controller is to:
     receive, when the first controller is active, an indication of a cluster role for the HA node in a cluster of HA nodes, and
     provide information regarding the cluster role from the first controller to the second controller acting as the backup for the first controller, via a mechanism used for exchanging HA state information independent of a clustering protocol, the information regarding the cluster role including an indication of which of the first controller and the second controller is active,
   wherein the second controller is to:
     responsive to receipt of the information regarding the cluster role, store the information in the non-persistent memory, and
     in response to a controller failover event within the HA node, perform a failover from the first controller to the second controller while preserving the cluster role of the HA node using the information, the cluster role that is preserved being the cluster role of the HA node prior to the failover from the first controller to the second controller,
   wherein in response to loss of the information in the non-persistent memory, the HA node is to cause initiation of a new leader election process to determine the cluster role of the HA node among the cluster of HA nodes.

9. The HA node of claim 8, wherein the cluster role is a leadership role in the cluster of HA nodes prior to the failover, and wherein the HA node maintains the leadership role in the cluster of HA nodes after the failover from the first controller to the second controller.

10. The HA node of claim 8, wherein the failover causes the second controller to become active.

11. The HA node of claim 10, wherein the second controller is to:
    after becoming active, utilize the information in the non-persistent memory to identify the cluster role of the HA node in the cluster of HA nodes.

12. The HA node of claim 11, wherein the second controller is to:
    receive an indication to change to a different cluster role; and
    provide information regarding the different cluster role from the second controller to the first controller via the mechanism used for exchanging HA state information independent of the clustering protocol.

13. The HA node of claim 8, wherein the cluster of HA nodes is a first cluster of HA nodes, and wherein the HA node is a member of a second cluster of HA nodes, and the HA node has a cluster role in the second cluster of HA nodes that is different from the cluster role of the HA node in the first cluster of HA nodes.

14. A non-transitory computer readable medium comprising computer executable instructions that when executed cause a high availability (HA) node having a first controller and a second controller to:
    receive, at the first controller when the first controller is active, an indication of a cluster role of the HA node within a cluster of HA nodes, the second controller to act as a backup for the first controller when the first controller is active;
    provide information regarding the cluster role from the first controller to the second controller acting as the backup for the first controller, via a mechanism used for exchanging HA state information independent of a clustering protocol, the information including an indication of which of the first controller and the second controller is active;
    store the information in a non-persistent memory of the HA node accessible to the second controller;
    in response to loss of the information in the non-persistent memory, initiating, from the HA node, a new leader election process to determine the cluster role of the HA node among the cluster of HA nodes upon a restart of the HA node; and
    in response to a controller failover event within the HA node, perform a failover from the first controller to the second controller while preserving the cluster role of the HA node, the cluster role that is preserved being the cluster role of the HA node prior to the failover from the first controller to the second controller.

15. The non-transitory computer readable medium of claim 14, wherein the cluster role is a leadership role in the cluster of HA nodes prior to the failover, and wherein the HA node maintains the leadership role in the cluster of HA nodes after the failover from the first controller to the second controller.

16. The non-transitory computer readable medium of claim 15, wherein the failover causes the second controller to become active.

17. The non-transitory computer readable medium of claim 16, wherein the instructions upon execution cause the HA node to further:
- after becoming active, utilize, at the second controller, the information in the non-persistent memory to identify the cluster role of the HA node.

18. The non-transitory computer readable medium of claim 17, wherein the instructions upon execution cause the HA node to:
- receive an indication to change to a different cluster role; and
- provide information regarding the different cluster role from the second controller to the first controller via the mechanism used for exchanging HA state information independent of the clustering protocol.

* * * * *